United States Patent

[11] 3,566,008

[72] Inventors Louis F. Ettlinger
Conover, N.C.;
Moreland P. Bennett, Pittsfield, Mass.
[21] Appl. No. 841,948
[22] Filed July 15, 1969
[45] Patented Feb. 23, 1971
[73] Assignee General Electric Company

[54] MECHANICAL AND ELECTRICAL JOINT BETWEEN COPPER AND ALUMINUM MEMBERS AND METHOD OF MAKING SUCH JOINT
4 Claims, 6 Drawing Figs.

[52] U.S. Cl................................................... 174/94,
29/503, 29/628, 174/84, 219/117, 219/118,
339/275
[51] Int. Cl................................................... H02g 15/08
[50] Field of Search.......................................... 174/84,
84.1, 90, 94; 339/275, 276.4; 29/503, 504, 497.5,
628, 630 (A), 630 (F)

[56] References Cited
UNITED STATES PATENTS

| | | | |
|---|---|---|---|
| 2,677,746 | 5/1954 | Duch et al. ................ | 29/630AX |
| 3,020,333 | 2/1962 | Bangert et al............. | 174/94 |
| 3,428,740 | 2/1969 | Wayboer.................... | 174/94 |

*Primary Examiner*—Darrell L. Clay
*Attorneys*—Francis X. Doyle, Vale P. Myles, Frank L. Neuhauser, Oscar B. Waddell and Joseph B. Forman ABSTRACT: A mechanical and electrical joint is obtained between copper and aluminum members by utilizing a tin-plated copper member having a portion formed in a tubular shape with a plurality of chamfered holes made in such tubular portion. Aluminum material to be joined to the copper member is formed with a tubular end which is inserted into the tubular portion of the copper member. Heat and pressure are applied to the tubular portion of the copper member until the aluminum melts and flows out of the chamfered holes forming a strong mechanical lock with good electrical characteristics.

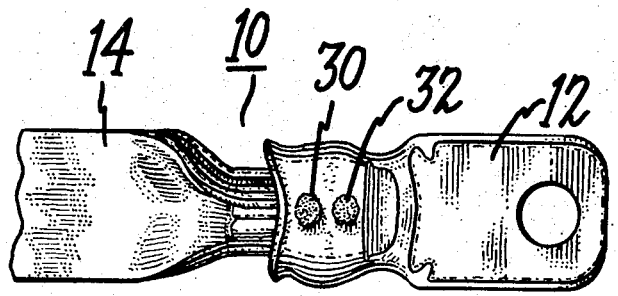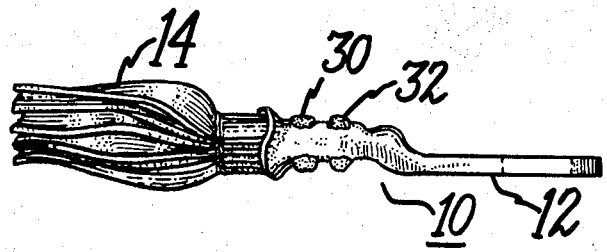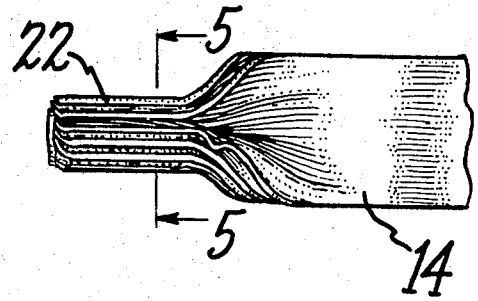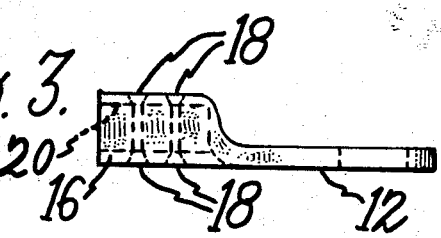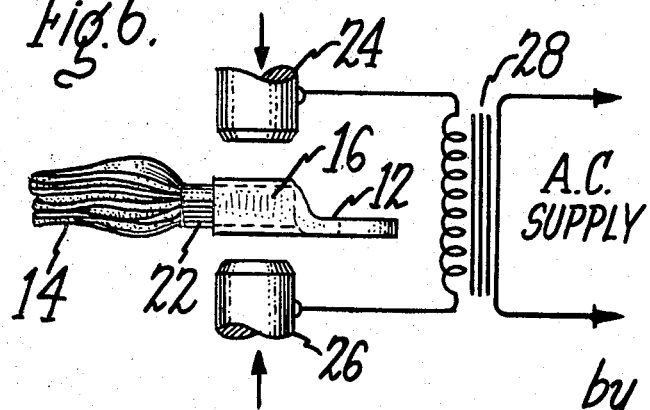

MECHANICAL AND ELECTRICAL JOINT BETWEEN COPPER AND ALUMINUM MEMBERS AND METHOD OF MAKING SUCH JOINT

BACKGROUND OF THE INVENTION

This invention relates to joints between copper and aluminum members and more particularly to a mechanical and electrical joint between copper and aluminum and to the method of making such joint.

The problems inherent in forming a joint between aluminum and copper are well known to those skilled in the metal-joining art. Dissimilar metals such as copper and aluminum do not normally form good eutectic bonds. The joints formed are generally unsatisfactory particularly for electrical applications since such joints have high electrical resistance. Further, the joints formed between copper and aluminum members are usually very weak in mechanical properties.

It has been disclosed in U.S. Pat. No. 2,790,656 that aluminum can be welded to a dissimilar metal if such metal is first provided with a coating or facing of silver metal. Then a weld may be made between the facing and the aluminum using an aluminum welding material. This joint between aluminum and the dissimilar metal such as copper has proved satisfactory both from an electrical and mechanical standpoint. However, this method of joining aluminum to copper is very time consuming and expensive and does not lend itself to production line techniques.

Recently, in the electrical apparatus field the use of aluminum strip winding to form coils has become widely used throughout the industry. This has lead to a requirement for finding a more advantageous way of joining aluminum to copper metal. This has become necessary due to the leads and crossovers of copper metal which are considered desirable when using aluminum strip windings.

It has recently been disclosed in U.S. Pat. No. 3,310,388 that bonds between copper and aluminum can be made by the use of a silver brazing alloy in apertures in the aluminum member with the copper metal on the opposite sides of the aluminum member. A brazing heat melts the alloy and forms a strong, low resistance bond between the members of the sandwich structure.

While this bond provides a good electrical and mechanical joint between the members, it has been considered desirable to obtain a secure electrical connection between copper and aluminum members without using a sandwich type of structure. Further, it is considered desirable to make such joints without the use of shims or alloys between the materials to enable such joints to be formed rapidly in a production line type of operation.

Recently it has been discovered that a secure mechanical joint having good electrical characteristics can be formed between copper and aluminum members by using a tin-plated copper member with chamfered holes therein and applying sufficient heat and pressure to extrude the aluminum material through such chamfered holes.

It is therefore one object of this invention to provide a novel method of joining copper and aluminum members.

Another object of this invention is to provide a novel joint between copper and aluminum members.

A still further object of this invention is to provide a novel joint between copper and aluminum members where the joint has excellent electrical characteristics and high mechanical strength.

Yet another object of this invention is to provide a novel joint between copper and aluminum members wherein the aluminum is extruded through holes in the copper member to form a secure mechanical lock between such members.

A still further object of this invention is to provide a novel method of forming a mechanically locked joint having good electrical characteristics between copper and aluminum members.

SUMMARY OF THE INVENTION

Briefly in one form this invention comprises a method of joining an aluminum member to a copper member in which a portion of the copper member is tin-plated and formed in a tubular shape with a plurality of chamfered holes in such tubular shape. A portion of the aluminum member is formed in a comparable tubular shape and inserted into the copper tubular portion. Heat and pressure are applied to the copper tubular portion until the aluminum melts and flows out of the chamfered holes. The invention also comprises the joint made by this method.

The invention which is desired to be protected will be particularly pointed out and distinctly claimed in the claims appended hereto. However, it is believed that this invention and the manner in which its various objects and advantages are obtained as well as other objects and advantages thereof will be better understood by reference to the following detailed description of a preferred embodiment thereof, especially when considered in the light of the accompanying drawing.

BRIEF DESCRIPTION OF DRAWING

FIG. 1 is a top view of one form of joint according to a preferred embodiment of this invention;

FIG. 2 is a side view of the joint of FIG. 1;

FIG. 3 is a side view of one form of copper member used in the joint of FIG. 1;

FIG. 4 is a top view of one form of aluminum strip member used in the joint of FIG. 1;

FIG. 5 is a sectional view of the aluminum end taken on line 5–5 of FIG. 4; and

FIG. 6 is a plan view showing one means of making the joint of FIG. 1.

DETAILED DESCRIPTION OF PREFERRED EMBODIMENT

As previously discussed, it has been discovered that a secure mechanical joint having good electrical characteristics can be formed between copper and aluminum by use of chamfered holes in the copper and extruding the aluminum material into such holes. Heat and pressure are applied to form the copper member about the aluminum member and to cause the aluminum to melt and extrude through the chamfered holes in the copper. Reference will now be made to the drawing, in which like reference numerals are used to indicate like parts throughout the various views thereof, for a more complete description of the novel method and joint of this invention.

Referring to FIGS. 1 and 2 there is shown a preferred form of copper to aluminum joint made according to this invention. As is shown, the joint 10 comprises a copper terminal member 12 and an aluminum strip member 14 joined together to form a secure mechanical and electrical joint. The copper terminal 12 is formed with a tubular portion 16, which may be cylindrical as indicated, having a plurality of chamfered holes 18 drilled or otherwise formed in portion 16 as best shown in FIG. 3. In the preferred form, holes 18 are placed in the top and bottom of portion 16 and are made with a chamfer with the smaller diameter of the holes being on the inside wall 20 of tubular portion 16. As will be understood by those skilled in the metal-joining art, the copper terminal member 12 may be formed from a tube having one end flattened to form the terminal member or it may be formed from flat stock into the desired tubular shape.

The aluminum member 14 as best shown in FIGS. 4 and 5 may be one or more strips of aluminum material having an end 22 formed in a tubular shape, such as the cylindrical shape particularly indicated in FIG. 5, for insertion into the tubular portion 16 as is shown, for example, in FIG. 6. As will be understood, the aluminum strip member 14 could be a single strip coming from an aluminum wound strip coil or it may be a plurality of strips which are folded together from a single wider strip to form a desired terminal to an aluminum coil. It is only required that the end portion of the strip 14 be formed in a tubular shape such as shown in FIG. 5 so as to fit within tubular portion 16 of the copper terminal 12.

In forming the joint of this invention, the copper terminal 12 is provided with the chamfered holes 18 in the tubular portion 16. The end 22 of the aluminum member 14 is then formed into a tubular portion, as indicated in FIG. 5, and the tubular portion 22 of aluminum member 14 is inserted into the tubular portion 16 of the copper terminal 12. This is shown particularly in FIG. 6 of the drawing. The joint 10 is then subjected to heat and pressure by a pair of electrode members 24 and 26 which are connected through a transformer 28 to provide resistance heating of the joint between the copper terminal 12 and the aluminum member 14. As will be understood when electrodes 24 and 26 are brought in contact with portion 16 of terminal 12 pressure is applied by the electrodes 24 and 26 forcing the copper portion 16 around the aluminum member 22. Heat will be generated by the resistance of the electrodes 24 and 26 and the copper terminal 12 causing sufficient heat to melt the aluminum material and cause it to extrude through the holes 18 in the tubular portion 16 of the copper terminal 12. As can be seen, particularly in FIG. 1, the aluminum material extrudes through the holes 18 in the copper terminal 12, as is shown particularly by the dots of aluminum 30, 32 in the top portion of part 16 of terminal 12 in FIG. 1.

In one particular joint made in accordance with this invention, a piece of aluminum strip 0.040 inches in thickness was slit and folded to form four layers of approximately 1.4 inches length material and the end was formed in a tubular shape for approximately 1 inch as is indicated by end 22 in FIG. 4. A copper terminal tin plated was provided with approximately ¾ inch tubular portion with the copper material being approximately 0.13 inches in thickness. Four 0.093 inches diameter holes having a smaller diameter on the inside wall were formed on the top and bottom of the tubular portion such as holes 18 in portion 16 in FIG. 3. The terminal was clamped between 1 inch diameter carbon electrodes and an electrode force of approximately 200 pounds and a current of approximately 3,000 amperes was applied. The electrode force caused the terminal tube 16 to collapse about the aluminum while the heat from the resistance and the electrical current caused the aluminum to melt, flow and extrude through the holes. The completion of the joint was observed by the collapse of the tubular portion 16 of the terminal 12 and the flow of the aluminum from underneath the face of the carbon electrodes.

As another example, according to this invention, four layers of 0.051" inches × 1.75 " inches aluminum strip was used. An end was formed into a cylindrical shape approximately 1.36 inches long and 0.70 inches in diameter, such as end 22 of FIG. 4. A tin plated copper terminal having a barrel or tube 1.25 inches long and 0.78 inches inside diameter with a wall thickness of 0.080 inches was used with four holes approximately 0.090 inches diameter and chamfered. The terminal was clamped between molybdenum electrodes approximately 1.25 inches square with a force of 5,500 pounds. A secondary current of 35,000 amperes was applied. The electrode force collapsed the terminal and the current melted the aluminum causing it to flow out through the chamfered holes.

It will, of course, be understood that the time for making the joints, the heat and pressure used, will depend on the type of aluminum material and the type of copper terminal and the amount of current provided. The completion of the joint can be observed by the flow of the aluminum from underneath the face of the carbon electrodes. Of course, the type of electrodes used will determine the necessary current required to obtain the desired heat for the joint. As is well known, carbon electrodes in general require less current to obtain a given heat than do electrodes of a refractory material, such as for example, molybdenum.

From the above description, it is believed that it will be apparent to those skilled in the metal-joining art that by means of this invention a strong mechanical joint is obtained between an aluminum member and a copper member, such joint having very good electrical characteristics.

Of course, it will be apparent that any type of tubular shape may be used, as desired. Also, it will be clear that joints may be formed between copper terminals and aluminum wire as well as strip.

While the specific preferred embodiment has been set forth in detail, it will of course be apparent to those skilled in the art that various changes may be made in the embodiment set forth without departing from the spirit and scope of the invention.

We claim:

1. A method of joining copper and aluminum comprising the steps:
   a. forming a plurality of chamfered holes in a tin-plated copper tubular member;
   b. forming an end of at least one aluminum member into a similar tubular shape;
      1. inserting said aluminum tubular end into said copper tubular member, and
   c. applying heat and pressure to force said copper tubular member against said aluminum tubular end and melt said aluminum and extrude said aluminum into said chamfered holes.

2. A method of joining copper and aluminum as set forth in claim 1 in which said copper is a flat member and a portion of said copper is formed into a tubular shape.

3. A joint between copper and aluminum comprising a tubular copper member having chamfered holes and a tubular aluminum member secured within said tubular copper member with said aluminum extruded into said chamfered holes.

4. A joint between copper and aluminum as claimed in claim 3 in which said copper tubular member is tin plated.